June 10, 1941.  A. B. KINZEL  2,244,709
VEHICLE
Filed Nov. 15, 1938
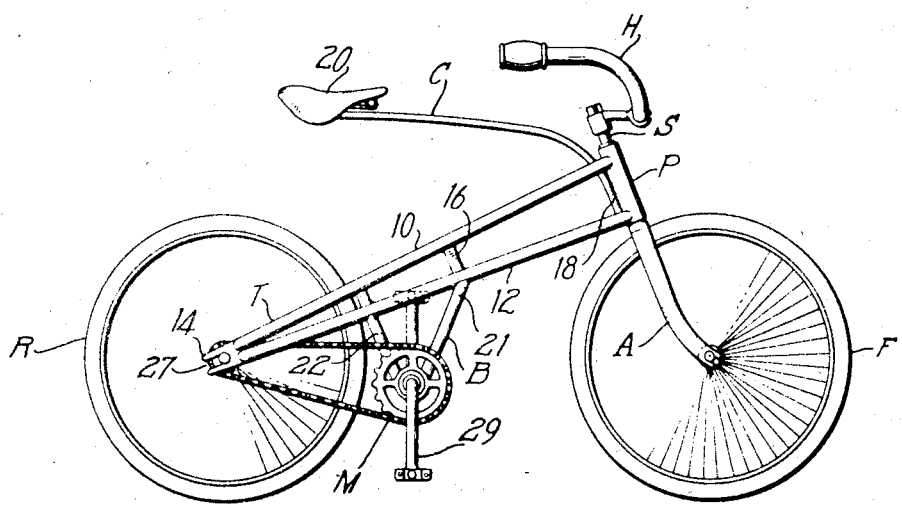
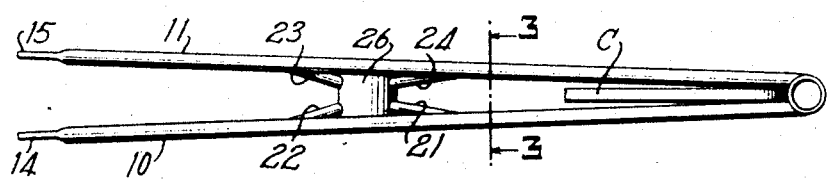
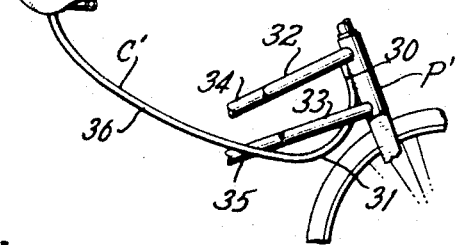
INVENTOR
AUGUSTUS B. KINZEL
BY
*E. L. Greenewald*
ATTORNEY Patented June 10, 1941

2,244,709

UNITED STATES PATENT OFFICE 2,244,709

VEHICLE

Augustus B. Kinzel, Douglaston, N. Y., assignor to Electro Metallurgical Company, a corporation of West Virginia Application November 15, 1938, Serial No. 240,436

1 Claim. (Cl. 280—281)

This invention relates to improvements in vehicles and more particularly to an improved bicycle.

Bicycles customarily have front and rear wheels, connected by suitable framework with which are associated steering means, a driving mechanism, and a seat for the rider. The steering means is journalled in a steering post at the front of the frame and extends downwardly to the front wheel, upon the axle of which it is supported, and the seat is supported by a seat post located upon the framework substantially midway between the front and rear wheels. In order to obtain the necessary strength and rigidity to resist bending moments produced by the weight of a rider, relatively heavy-walled tubing must be used, as well as structural members joining the seat post to the axle of the rear wheel. Thus, it may be seen that bicycle frames are usually constructed about two main localities of loading, the steering post and the seat post.

In order to sustain the seat post and still give clearance to the rear wheel without reducing its size, it is necessary to place the axle of the rear wheel at a greater distance from the pedal crank than is required for other purposes, thus necessitating the use of a longer frame with a consequent increase in weight.

An object of this invention, therefore, is to provide an improved vehicle, such as a bicycle, which shall be provided with a framework having all the main stress joints located at a single locality, thus permitting complete freedom of design.

Other objects of this invention are to provide a vehicle, such as a bicycle, having an improved seat support adapted to promote the ease and comfort of the rider; having a frame work so designed as to permit the use of relatively thin-walled high strength tubing with consequent reduction in weight; having a frame so designed as to be equally suitable for use by men and women; and having an improved pedal-crank bearing support.

The above and other objects will become apparent from the following description taken in connection with the accompanying drawing, wherein:

Fig. 1 is a side elevation of a bicycle embodying the principles of the invention;

Fig. 2 is a plan view of the frame structure shown in Fig. 1;

Fig. 3 is a vertical sectional view taken along the line 3—3 of Fig. 2; and

Fig. 4 is a partial side elevation of a bicycle embodying a modification of the seat support of the invention.

In general, my invention contemplates the provision of an improved bicycle frame in which all the main stress joints are located at a single locality, i. e., the steering post. As shown in Fig. 1 of the drawing, which illustrates the preferred embodiment of the invention, the improved bicycle comprises a substantially vertical steering post P in which is journalled a steering column S extending downwardly to the front wheel axle. Secured to the steering post P are a simple rigid center truss T which extends rearwardly and downwardly to the rear wheel axle to which it is secured, and a cantilever seat support C secured to the steering post at its front end and extending rearwardly therefrom. Suspended from the truss T intermediate the ends thereof is a pedal-crank bearing support B.

In a bicycle frame such as has been described, all the main stress joints, which are adapted to resist bending moments produced by the weight of a rider, are located at the steering post. Because of this, the steering post, the simple rigid center truss, and the cantilever seat support, need only be designed to resist substantially constant stresses, thereby permitting the use of lighter tubing than is possible in other bicycles. In other bicycles, the constantly shifting weight of the rider produces variable stresses in the numerous structural members and joints, with the result that each must be designed to resist the maximum overload to which it can possibly be subjected. Furthermore, with the lower stresses produced in the main center truss T of the invention, the use of very thin walled high strength tubing becomes practicable, resulting in a still further reduction in weight.

Another advantage of this improved structure is the complete elimination of a seat post and frame members extending between the seat post and the axle of the rear wheel, as is required in other bicycles. Thus, the problem of providing sufficient clearance between the rear wheel and the seat post is non-existent. Because of this, it is possible to space apart the front and rear wheels a shorter distance than is the usual practice, with commensurate reduction in the weight of the bicycle frame.

In the preferred embodiment of the invention, as shown in Fig. 1, the improved bicycle includes a steering post P, in which is journalled a steering column S, having handle-bars H secured to the upper end thereof and terminating at its lower end in a fork A which straddles the front wheel F and is suitably secured to the axle thereof. Secured to the steering post is a rearwardly extending forked rigid main center truss T which comprises four straight longitudinal tubes or stays 10, 11, 12, and 13 arranged in upper and lower pairs and, laterally spaced from one another, two of which, 10 and 11, depart divergently from the top of steering post P, one from each end thereof, and the other two, 12 and 13, depart divergently from the lower end of the steering post in a similar manner. Each pair of side tubes 10 and 12, and 11 and 13 extend directly downward from the steering post P to the rear end of the truss T and converge to their respective points of juncture 14 and 15. Suitable cross braces, such as the generally vertical struts 16, may be provided between side tubes 10 and 12, and 11 and 13 to increase the rigidity of truss T. The rear end of each fork of the main center truss T is provided with suitable means, such as the slots 27 and 28, to engage the axle of rear wheel R which is adapted to revolve between the forks.

A cantilever seat support C is also rigidly connected at its front end 18 to the steering post P and extends rearwardly therefrom in an approximately horizontal direction, being free of any connection to the center truss T except at the front of the seat support. The free end of the cantilever seat support C, which is spaced a substantial distance from the main truss T so that the seat support will maintain the free end and the main truss in spaced relation during the normal motion of a rider, is adapted to support a seat 20 of any conventional kind. This cantilever seat support C advantageously comprises a strong resilient bar which acts as a spring to absorb shocks, and consequently increase the ease and comfort of the rider.

It is apparent, therefore, that with the bicycle construction as described, the joints which must resist the greatest stress produced by the weight of a rider are all concentrated at the steering post.

Intermediate the ends of the main center truss T is a pedal-crank bearing support B wholly secured to the truss T and comprising two pairs of stays 21, 22, and 23, 24, secured to and extending downwardly from bottom tubes 12 and 13, respectively; and all of these stays converge together to bearing housing 26 to which they are secured. The upper ends of the stays 21, 22 and 23, 24 are secured to the tubes 12 and 13 at points spaced substantial distances from the ends of the tubes and from each other, thus insuring the maintenance of the suspended bearing housing 26 in fixed relation to the main truss T, and the even distribution over the main truss of forces exerted upon the bearing housing. Journalled in bearing housing 26 is a pedal crank 29 actuatable by a rider to operate the driving mechanism M and propel the bicycle.

Cantilever seat support C and all members of main center truss T and pedal crank bearing supporting truss B may be rigidly secured at their respective joints by any suitable means, although welding has been found most advantageous to produce the greatest strength and rigidity.

In Fig. 4 is shown a form of cantilever seat support differing somewhat from that of Figs. 1 and 2. In this modification, cantilever seat support C' comprises a strong resilient bar secured to steering post P' at its front end 30, having a portion 31 extending sharply downwardly therefrom centrally between the pairs of main center truss tubes 32, 33, and 34, 35, and having its lowest point below the level of the lower main truss tubes 33 and 35. A second portion 36 of cantilever support C' is directed sharply upwardly from the lowest point of portion 31 and is adapted to support at its free end a seat 37 of any conventional type. This type of cantilever seat support is especially suitable for use by women as it permits skirts to hang freely in the upwardly open bight defined by the main truss and the portion 36 of the cantilever seat support member, which extends sharply downward from its free end to the main truss intermediate the ends of the latter, and thereby prevents any hindrance with the leg motion in pedaling. It is obvious, however, that a bicycle constructed according to the invention, as shown in Fig. 4, may be used equally well by either sex.

From the foregoing, it is evident that an improved bicycle has been provided in which all the main stress joints are located at a single locality, thus permitting complete freedom of design and a considerable reduction in weight as compared to other bicycles.

I claim:

In a vehicle, such as a bicycle, a rigid truss member having a steering post at the forward end thereof, said truss member being adapted to engage a rear-wheel axle at the rearward end thereof, and said truss member including straight stay means extending directly from said steering post downwardly to said rearward end; and a seat support comprising a cantilever member having a fixed end rigidly connected to said steering post, a free end spaced a substantial distance from said stay means, and a portion extending sharply downward from said free end to said truss member intermediate the ends thereof; said truss member and the downwardly-extending portion of said cantilever member defining together an upwardly open bight wherein a rider's skirt-like garment may hang freely.

AUGUSTUS B. KINZEL.